(12) United States Patent
Sporck et al.

(10) Patent No.: US 9,641,014 B2
(45) Date of Patent: May 2, 2017

(54) CIRCUITS AND METHODS FOR CONTROLLING SKIN TEMPERATURE OF AN ELECTRONIC DEVICE

(71) Applicant: QUALCOMM Incorporated, San Diego, CA (US)

(72) Inventors: Christian G Sporck, Campbell, CA (US); Giovanni Garcea, San Jose, CA (US); Shadi Hawawini, Mountain View, CA (US); Todd R Sutton, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 14/179,403

(22) Filed: Feb. 12, 2014

(65) Prior Publication Data
US 2015/0229155 A1 Aug. 13, 2015

(51) Int. Cl.
*H02J 7/00* (2006.01)

(52) U.S. Cl.
CPC .......... *H02J 7/0073* (2013.01); *H02J 7/0091* (2013.01)

(58) Field of Classification Search
USPC ....................................................... 320/107
See application file for complete search history.

(56) References Cited

U.S. PATENT DOCUMENTS

| | | | |
|---|---|---|---|
| 5,563,578 A * | 10/1996 | Isenstein | G08B 21/14 340/521 |
| 6,570,362 B1 | 5/2003 | Estes et al. | |
| 8,203,314 B2 | 6/2012 | Odaohhara | |
| 2005/0231169 A1* | 10/2005 | Seo | G01K 7/24 320/150 |
| 2007/0013345 A1 | 1/2007 | Ikeda et al. | |
| 2009/0112503 A1 | 4/2009 | Hattis | |
| 2009/0295334 A1* | 12/2009 | Yang | H02J 7/0072 320/134 |
| 2010/0007310 A1 | 1/2010 | Kawamoto et al. | |
| 2013/0093399 A1* | 4/2013 | Svensson | H02J 7/047 320/150 |
| 2013/0120630 A1* | 5/2013 | Kim | H04N 5/23241 348/333.01 |

(Continued)

FOREIGN PATENT DOCUMENTS

| | | |
|---|---|---|
| CN | 101599552 A | 12/2009 |
| EP | 1848088 A1 | 10/2007 |

(Continued)

OTHER PUBLICATIONS

International Search Report and Written Opinion—PCT/US2015/015571—ISA/EPO—Jun. 3, 2015.

(Continued)

*Primary Examiner* — Bryce Aisaka
(74) *Attorney, Agent, or Firm* — Haynes and Boone, LLP (57) ABSTRACT

The present disclosure includes circuits and methods for controlling skin temperature of an electronic device. In one embodiment, a thermal sensor is configured on a case of a handheld electronic device. The thermal sensor is coupled to a battery charger having a current limit circuit. If the sensed temperature of the case increases above a threshold, a current limit is reduced to reduce current in the battery charger.

22 Claims, 8 Drawing Sheets

(56) References Cited

U.S. PATENT DOCUMENTS

2013/0193776 A1    8/2013  Tanaka

FOREIGN PATENT DOCUMENTS

GB            2197761 A     5/1988
JP          2010124246 A    6/2010

OTHER PUBLICATIONS

"TPS65090A Frontend PMU With Switchmode Charger for 2-3 Cells in Series, Data Manual", Jul. 31, 2013 (Jul. 31, 2013), XP055189729, Retrieved from the Internet: URL: http://www.ti.com/lit/ds/symlink/tps65090.pdf [retrieved on May 18, 2015] pp. 8-9; Functional block diagram (p. 19); pp. 39-41; Fig. 3-9 (p. 52).

* cited by examiner

CIRCUITS AND METHODS FOR CONTROLLING SKIN TEMPERATURE OF AN ELECTRONIC DEVICE

BACKGROUND

The present disclosure relates to electronic circuits and methods, and in particular, to circuits and methods for controlling the skin temperature of an electronic device.

Integrated circuits in handheld mobile devices are consumer ever increasing amounts of power. As mobile devices become more powerful, battery capacities must increase to give a consistent amount of run time. Power through the devices generates heat, and charging the devices at high current further increases this heat. In some cases the amount of heat generated by a mobile device can become uncomfortable or even dangerous for a user who may touch the surface of the device with bare skin. Many device manufacturers are setting thermal specifications that limit the case (or skin) temperature of these devices. However, meeting these thermal specifications without sacrificing performance is a growing challenge.

For example, it is sometimes desirable to provide customers with a fast battery charging solution that keeps the skin temperature of a cellular smart phone within thermal specifications. Accordingly, it is a challenge to accurately regulate the skin temperature of the phone to maximize charging performance.

SUMMARY

The present disclosure includes circuits and methods for controlling skin temperature of a mobile device. In one embodiment, a thermal sensor is configured on a case of a handheld electronic device. The thermal sensor is coupled to a battery charger having a current limit circuit. If the sensed temperature of the case increases above a threshold, a current limit is reduced to reduce current in the battery charger.

The following detailed description and accompanying drawings provide a better understanding of the nature and advantages of the present disclosure.

DETAILED DESCRIPTION

The present disclosure pertains to controlling temperature in electronic devices. In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Figure 1:
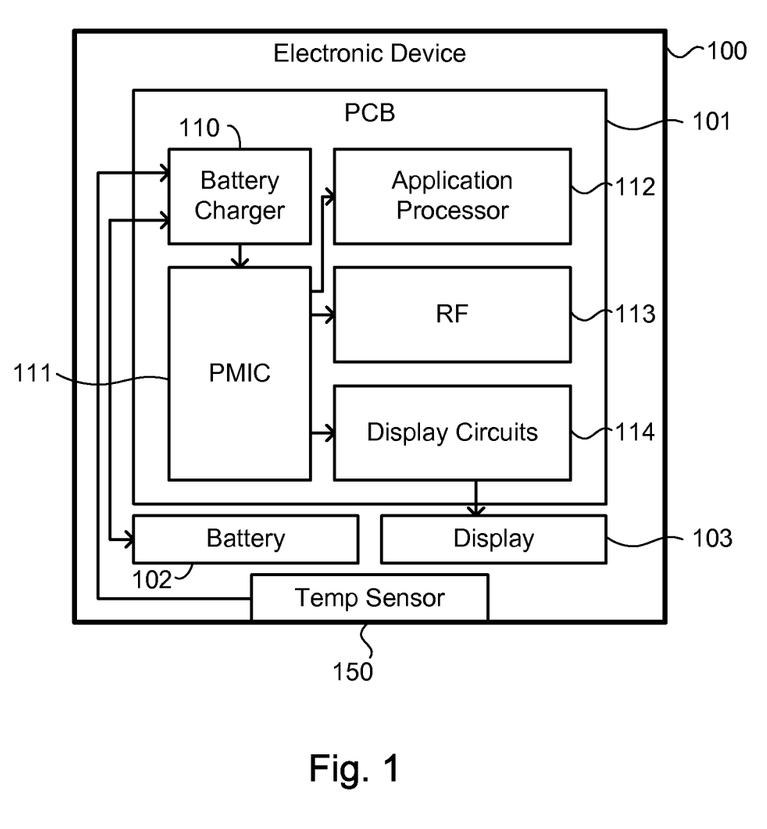
FIG. 1 illustrates an electronic device according to one embodiment.

FIG. 1 illustrates an electronic device according to one embodiment. Electronic device 100 may be a mobile device such as a mobile phone, smart phone, tablet computer, or other form of device where users are in physical contact with an external surface of the device's case, for example. Features and advantages of the present invention include controlling a skin temperature of an electronic device, such as a handheld mobile device, so that the temperature of the casing does not exceed a threshold, which may correspond to an uncomfortable or dangerous temperature for contact with a human hand.

Electronic device 100 may include heat generating electronic components such as power management circuits, data processors, communication circuits, and interface electronics. In this example, one or more circuit boards (PCBs) 101 may include a battery charger 110 for charging a battery 102, power management integrated circuit (PMIC) 111, application processor 112, radio frequency communication circuit 113 (e.g., an RF transmitter and/or receiver) and display circuits 114 for driving a display 103. One or more of these devices may generate significant heat during various modes of operation of the device. The heat may radiate out through the casing of the device and increase the temperature of the case to a point that is harmful or undesirable for contact by a user. The temperature of the external surface of the case is often referred to as the skin temperature.

Embodiments of the present invention include one or more thermal sensor circuits ("Temp Sensors") 150 configured to sense temperature of the case to control the skin temperature. Thermal sensor circuits are also referred to as thermal sensors, temperature sensor circuits, or temp sensors, for example. In one embodiment, thermal sensor 150 is configured on an internal surface of the case, although in alternative equivalent embodiments the thermal sensor may be configured in other ways to sense the skin temperature. In this example, thermal sensor 150 is coupled to battery charger circuit 110 to control current in the battery charger. For instance, battery charger 110 may receive power from an external source, as described in more detail below, and provide power to battery 102 or downstream components such as PMIC 111, processor 112, RF circuits 113, and display circuits 114, for example. Embodiments of the present disclosure may sense skin temperature using a thermal sensor 150 and couple signals, such as a voltage, to battery charger 110 to set a current limit, which controls a maximum current in the battery charger. Reducing a current limit may reduce a maximum current flowing to battery 150 or to PMIC 111 and downstream components, for example, and reduce power dissipation in battery charger 150 to reduce the skin temperature.

Figure 2:
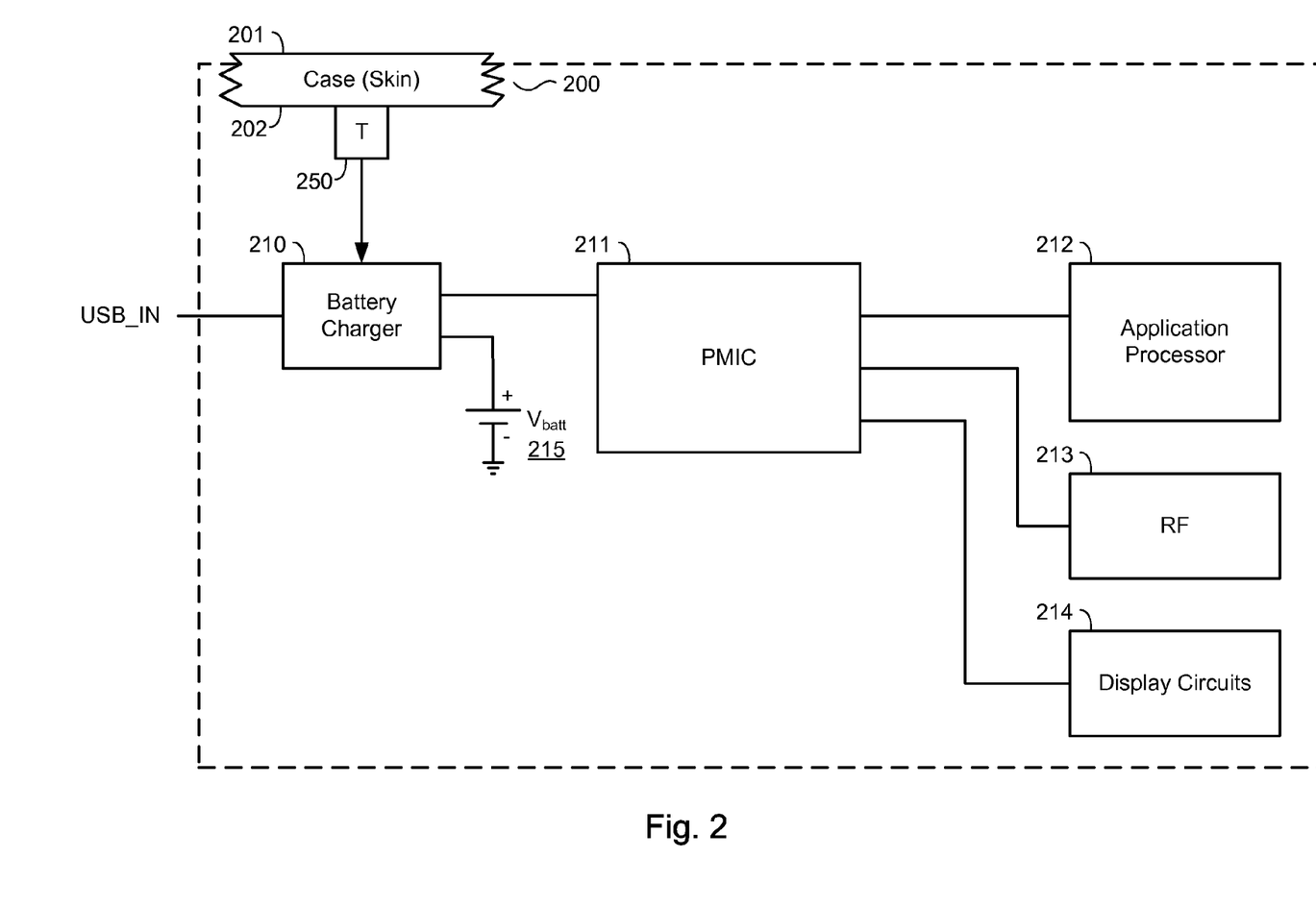
FIG. 2 illustrates a circuit for controlling case temperature according to one embodiment.

FIG. 2 illustrates a circuit for controlling case temperature according to one embodiment. This example illustrates power distribution in an example mobile electronic device. Battery charger 210 may receive power from an external power source to charge battery 215 and/or provide power to PMIC 211 and downstream components. In this example, battery charger 210 provides power (e.g., voltage and current) to PMIC 211. In some embodiments, battery charger 210 may be included as part of PMIC 211. PMIC 211 may include multiple switching regulators to provide power to one or more processors (e.g., a microprocessor or graphics processor), RF circuits, or display circuits. Display circuits 214 may include boost voltage converter switching power supplies, regulators, and/or driver circuits to driving an electronic devices display, for example.

In this example, a thermal sensor 250 is arranged on an internal surface 202 of a case 200 (or skin) of the electronic device. Thermal sensor 250 may be placed proximate to an electronic component generating heat during operation. For example, various embodiments may position the thermal sensor proximate to the location of the battery charger, PMIC, processor, RF circuits, or display circuits (or combinations thereof as described below) which may produce a significant amount heat during operation. For example, a circuit board may position battery charger circuit 210 at a particular location inside the case of the electronic device. Accordingly, heat generated by the battery charger circuit 210 may radiate out toward the inner surface of the case, creating a hot spot at a particular location on the device proximate to a battery charger integrated circuit, for example. Between the battery charger IC and the inner surface, heat may radiate through one or more other materials inside the case, such as a PCB, a heat spreader, an electro-magnetic interference shield, the battery, the display, or other materials or components, for example. Embodiments of the present disclosure may sense the temperature proximate to a battery charger integrated circuit and reduce power dissipation in the battery charger by changing a current limit. For example, if the case temperature increases beyond a threshold, the current limit may be reduced to reduce power dissipation and reduce the skin temperature proximate to the battery charger, thereby eliminating the hot spot. Battery charger ICs are sometimes used to provide power to an entire system, so it may be advantageous to implement thermal control in the battery charger, for example.

Figure 3:
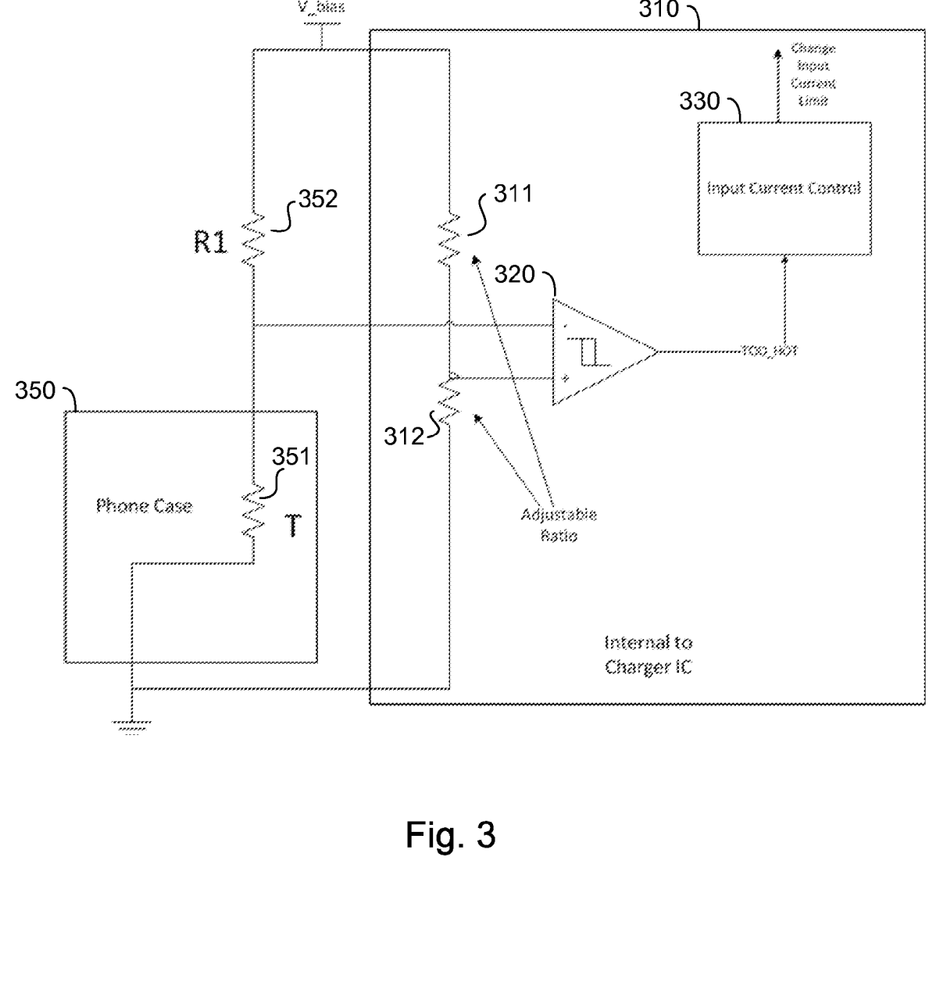
FIG. 3 illustrates an example circuit for adjusting a current limit in a battery charger according to one embodiment.

FIG. 3 illustrates an example circuit for adjusting a current limit in a battery charger according to one embodiment. In this example, a thermal sensor 350 comprises a thermistor 351 having a variable temperature dependent resistance. One terminal of the thermistor is coupled to ground and a second terminal of the thermistor is coupled to a reference voltage (e.g., V_bias) through a resistor 352 to form a voltage divider. Accordingly, as the temperature at the thermistor changes, the changing resistance of the thermistor changes a voltage on the voltage divider. The voltage from the thermal sensor 350 is coupled to an input (e.g., a package pin) of a battery charger integrated circuit 310. Battery charger 310 includes a comparator circuit 320 having a first input coupled to the second terminal of the thermal sensor 350 and a second input coupled to a reference voltage. In this example, the reference voltage is generated by a second resistor divider comprising resistor 311 and resistor 312 configured between reference voltage V_bias and ground. Resistances of resistors 311, 312, and 352 and thermistor 351 are configured so that when the temperature of the case (e.g., a phone case) sensed by the thermal sensor 350 meets a threshold, the voltage from the thermal sensor increases above the reference voltage at the other input of comparator 320, which causes the comparator to change state. In this example, the output of the comparator 320 is coupled to an input current control circuit 330, which receives the comparator output signal and changes the input current limit of battery charger 310 (e.g., to reduce a maximum input current to the battery charger). While an input current limit is shown here, it is to be understood that other embodiments may adjust an output current limit, for example.

In one embodiment, the reference voltage provided at the input of comparator 320 may be programmable. For example, in one example, resistor 311 or resistor 312 (or both) may be programmable to adjust the divider ratio and change the reference voltage. Accordingly, the threshold at which comparator 320 causes a change in the current limit may be modified. Therefore, the temperature at which the thermal sensor triggers a change in the current limit may be programmable.

Figure 4:
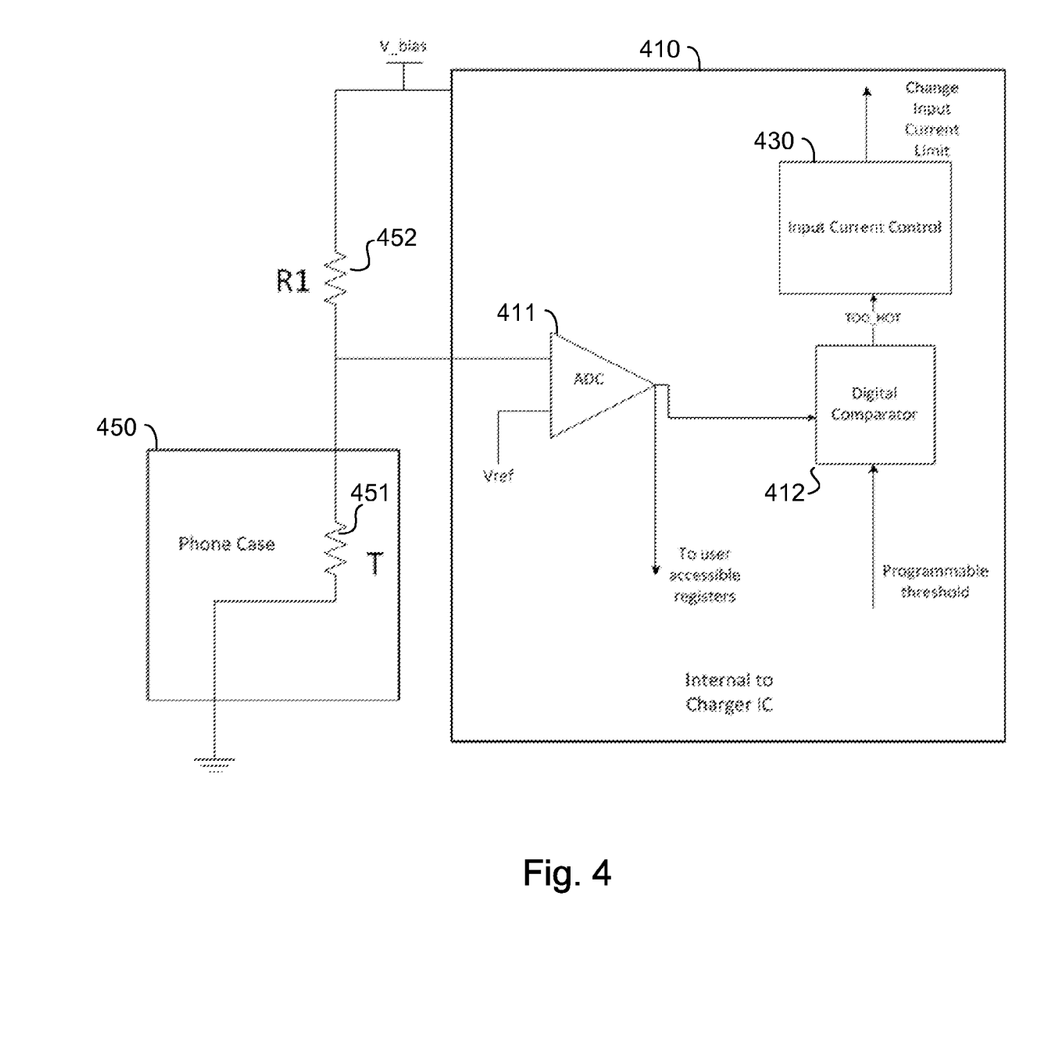
FIG. 4 illustrates an example circuit for adjusting a current limit in a battery charger according to another embodiment.

FIG. 4 illustrates an example circuit for adjusting a current limit in a battery charger according to another embodiment. In this example, a thermistor 451 in a thermal sensor 450 and resistor 452 are coupled to an input of an analog-to-digital converter (ADC) 411 on a battery charger IC 410. Another input of ADC 411 is coupled to a reference voltage. ADC 411 receives a voltage from thermal sensor 450 and converts the voltage into a digital representation of the voltage (e.g., digital bits). An output of ADC 411 may be coupled to a digital comparator 412. Digital comparator 412 receives the digital representation of the thermal sensor voltage from ADC 411 and a digital representation of a threshold. Similar to the circuit in FIG. 3, when the thermal sensor voltage meets a particular threshold, the digitized voltage increases above the digital threshold and digital comparator 412 produces an output signal to input current control circuit 430 to change an input current limit. Accordingly, when a temperature on the case increases to a threshold, a maximum input current in the battery charger is reduced to reduce the temperature of the case.

While the above circuits in FIGS. 3 and 4 have been illustrated as coupling voltage between the thermal sensor and battery charger, it is to be understood that other embodiments may use current to communicate temperature information from the thermal sensor to the battery charger. Additionally, while FIGS. 3 and 4 illustrate an example limiting input current, it is to be understood that other embodiments may limit output current. One advantage of one example embodiment that couples a thermal sensor to a battery charger is that software may not be required to control the temperature. For example, if a mobile device is turned off while the battery is charging, current in the battery charger may cause undesirable hot spots on the device case, which might cause injury if a user were to pick up the device. However, if a thermal sensor is configured to measure case temperature and reduce current in the battery charger when the temperature is too high, thermal control may be advantageously implemented without the need for system software, such as the operating system or other software applications.

Figure 5A:
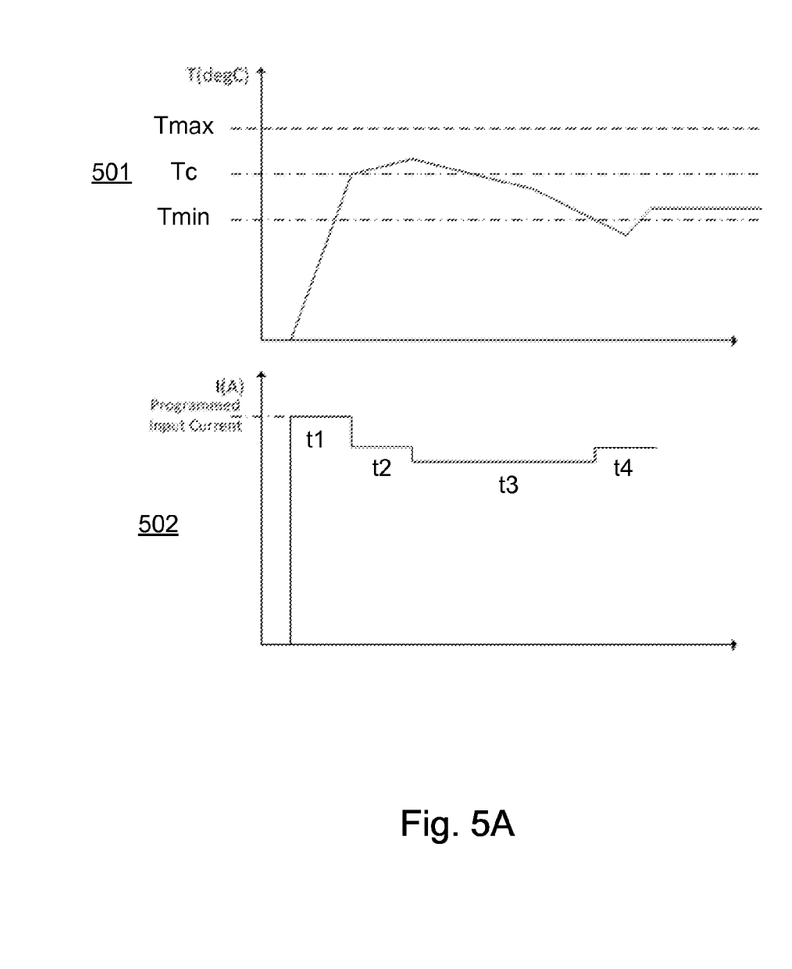
FIG. 5A is a plot illustrating an algorithm according to one embodiment.

FIG. 5A is a plot illustrating an algorithm according to one embodiment. In one embodiment, a device may have set temperature limits that guarantee the device never operates outside a pre-defined maximum temperature. In this example, the system attempts to maintain a constant case (or skin) temperature by adjusting the current limit down and up based on a sensed temperature of the case. For example, as illustrated in plots 501 and 502, initially a current limit may be set high and the case temperature begins to increase over time period t1. When the temperature of the case increases above Tc (a center temperature within a window defined by a maximum temperature Tmax and minimum temperature, Tmin) the current limit is reduced. In this example, the temperature continues to increase at the new current limit value during t2. Accordingly, the current limit is reduced again. The temperature begins to decrease during t3 until the temperature drops below Tmin. In one embodiment, after a first reduction, an additional reduction happens after a timer expiration (e.g., 2 seconds). After the temperature drops below Tmin, the current limit may be increased, which causes the temperature to increase again. In this manner, the algorithm may ensure the temperature does not increase above Tmax, for example.

Figure 5B:
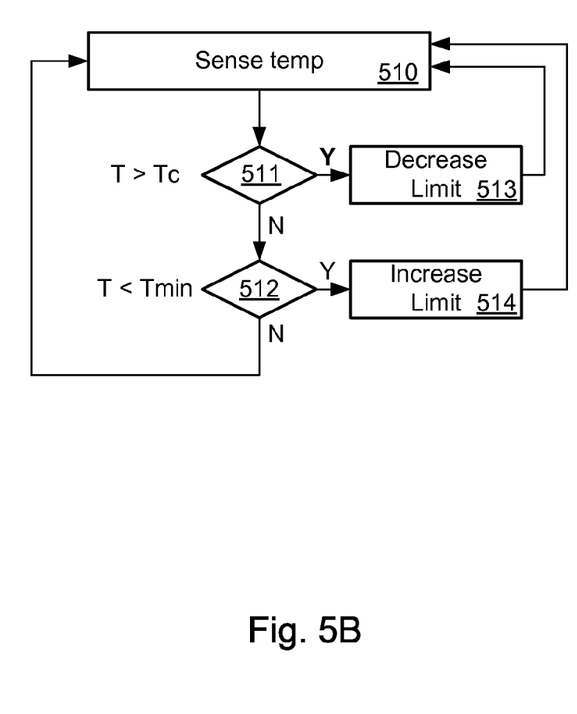
FIG. 5B illustrates a process of controlling case temperature according to one embodiment.

FIG. 5B illustrates a process of controlling case temperature according to one embodiment. At 510, a thermal sensor circuit configured on the case may sense temperature. At 511, an electronic signal corresponding to the temperature is processed by a circuit to determine if the case temperature is greater than a first temperature (e.g., Tc) at 511. If the case temperature is too high, then a current limit is decreased at 513 and the process returns to 510. If the case temperature is less than a first temperature, then the circuit may determine if the case temperature is less than a second temperature (e.g., Tmin) at 512. If the case temperature is less than a second temperature, then a current limit may be increased at 514 and the process returns to 510. Otherwise, the process returns to 510 to continue monitoring the case temperature. The above algorithm may be implemented in software, digital hardware (e.g., reconfiguring the references, digital thresholds, or resistors described above), or analog hardware (e.g., using a window comparator).

Figure 6:
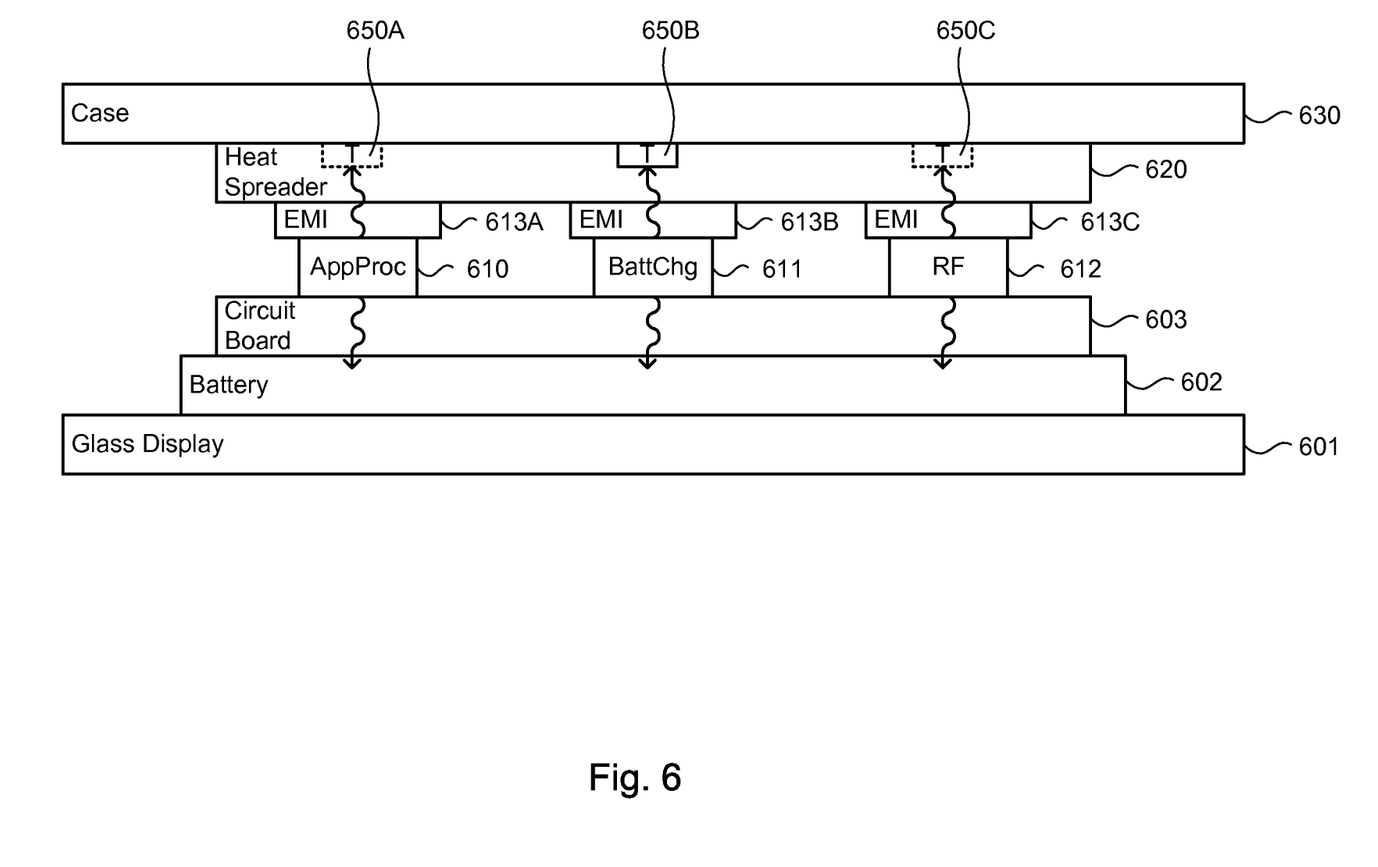
FIG. 6 illustrates an example configuration of integrated circuits in a mobile device according to one embodiment.

FIG. 6 illustrates an example configuration of integrated circuits in a mobile device according to one embodiment. This example illustrates how an application processor IC 610, battery charger IC 611, and RFIC 612 may be configured inside a case of a handheld device. The device may include an outer surface comprising a glass display 601 and case 630. In this example, a battery 602 is configured on an inner surface of display 601. Processor 610, battery charger 611, and RFIC 612 may be arranged on a circuit board 603, which may be placed on an upper surface of battery 602. Electro-magnetic interference (EMI) shielding 613A-C may be placed on top of each IC, and one or more heat spreaders 620 may be placed between the EMI layer and an interior surface of the case 630, for example. In this example, the battery may act as a heat sink reducing the amount of heat transferred to an outer layer of the display. However, hot spots may occur on the case 630 in locations proximate to the ICs. In this example, one or more thermal sensors 650A-C are arranged between an interior surface of case 630 and an upper surface of heat spreaders 620 to sense the temperature of the case and maintain each location below a maximum temperature. It is to be understood that the above configuration is just one example configuration illustrating the advantages of sensing and controlling case temperature according to the various embodiments of the present disclosure.

Figure 7:
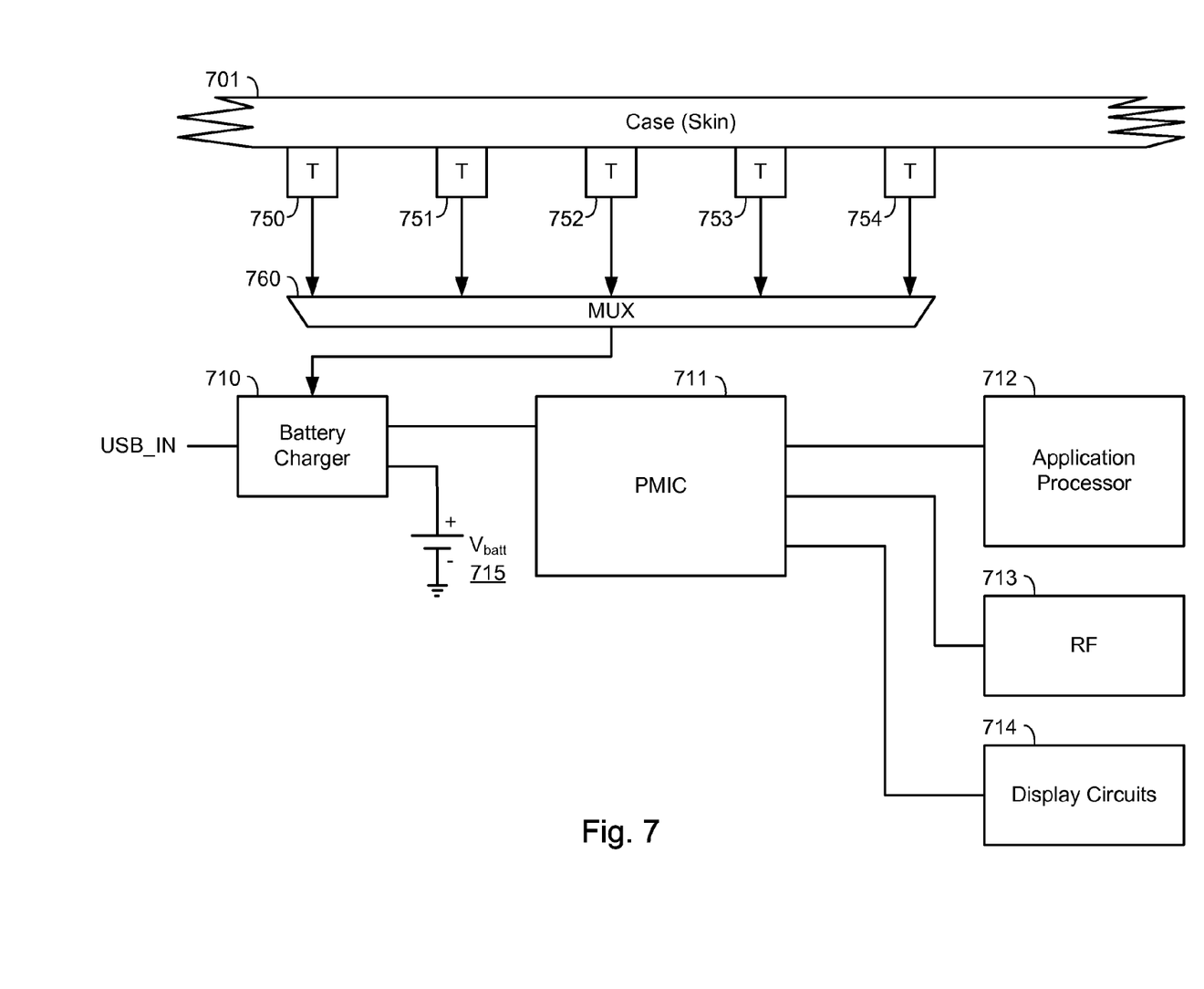
FIG. 7 illustrates a circuit for controlling case temperature according to another embodiment.

FIG. 7 illustrates a circuit for controlling case temperature according to another embodiment. As illustrated by the example in FIG. 6, multiple ICs in an electronic device may generate heat and cause hot spots on the outer surface of the case during different modes of operation. For example, during battery charging the battery charger may produce hot spots, during intense data processing the processor may produce hot spots, during extensive wireless transmission and reception the RF circuits may produce hot spots, and during active use of the display interface the display circuits may produce hot spots. Accordingly, in one embodiment, multiple thermal sensors 750-754 may be arranged to sense the temperature of a case 701 at different locations (e.g., proximate to different heat producing ICs) and monitored to reduce system power, for example. In this example, a multiplexer (MUX) may be used to select a thermal sensor having the highest temperature. For example, in one embodiment battery charger 710 may iteratively sense a voltage from each thermal sensor by changing the select input of MUX 760. When a particular voltage from a particular thermal sensor increases above a threshold, battery charger 710 may maintain the particular thermal sensor as an input to control the temperature. In one embodiment, when a particular thermal sensor voltage is above a threshold, the battery charger may monitor the voltage from the thermal sensor for an extended time period, but periodically iterate through the other thermal sensors to make sure one of the others has not also increased above the threshold, for example. Since battery charger 710 provides power to PMIC 711, processor 712, RFIC 713, and display circuit 714, reducing the heat contribution from battery charger 710 will reduce the aggregate heat at the case and lower the temperature, for example.

Figure 8:
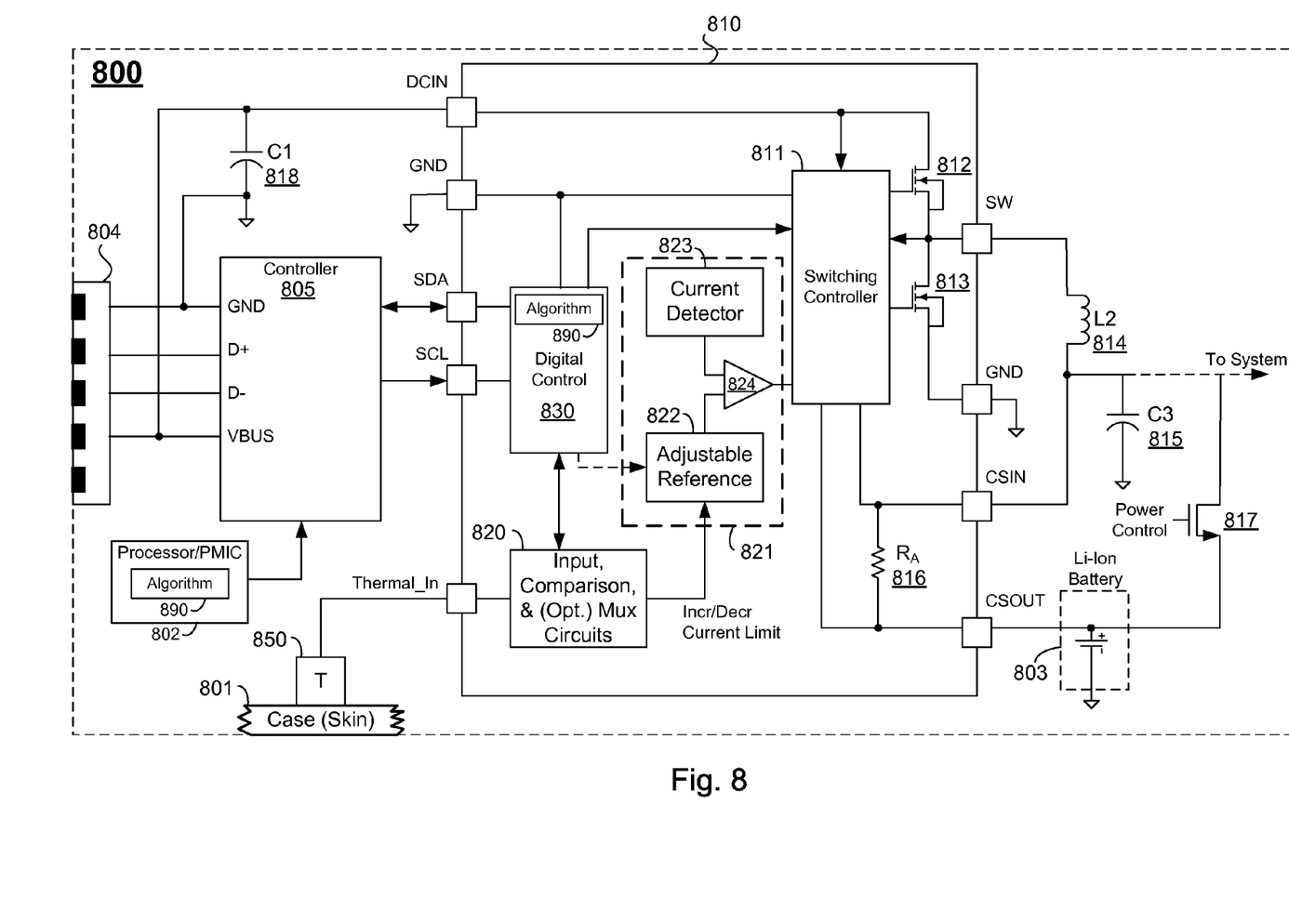
FIG. 8 illustrates an example temperature sensor circuit and battery charger circuit to control case temperature according to another embodiment.

FIG. 8 illustrates an example temperature sensor circuit and battery charger circuit to control case temperature according to another embodiment. This example shows a handheld mobile device 800 including a case 801 enclosing a battery charger 810, controller 805 and other system electronics as described above. Case 801 may include a socket 804 for receiving a cable, such as a USB cable, for example. In this example, a USB cable received by socket 804 includes a power supply voltage VBUS, ground (GND), and two data lines (D+ and D−). A cable connected to a USB port may provide power and data to the device 800, whereas a cable connected to a USB power adapter (e.g., a wall adapter) may supply power and ground. In this example, VBUS, GND, D+, and D− are coupled to controller 805 which may communicate information to battery charger 801 or other system electronics over a serial data bus (SDA and SCL). In other embodiments, a battery charger may perform the USB detection internally. An application processor may be connected to D+ and D−, and Vbus may only be connected to the PMIC and battery charger, for example.

VBUS is received by battery charger 810, which uses voltage and current from VBUS to charge a lithium ion battery 803 or provide power to downstream components, or both, for example. A thermal sensor 850 is configured to sense a temperature of case 801 and limit current in battery charger 810. In this example, battery charger 810 includes switching controller 811, field effect transistor (FET) 812, and FET 813, which are coupled to inductor 814 and capacitor 815 to form a switching regulator. Current flows into the DCN pin to a switching node SW, through inductor 814. In battery charging mode, current flows into CSIN, through a current sense resistor 816, to CSOUT, and into battery 803. A voltage difference between CSIN and CSOUT across resistor 816 is related to the output current and may be used to control a PWM signal that drives FETs 812 and 813 in current control mode. A voltage on CSOUT is the battery voltage and may be used to control the PWM signal and FETs in voltage control mode, for example. In one embodiment, a power control switch 817 may be activated to provide power from battery 803 to system components, for example.

A voltage generated by thermal sensor 850 is coupled to a thermal input (Thermal_In) of battery charger 810. The voltage from thermal sensor 850 is received by an input circuit, comparison circuit, and optional MUX circuit 820.

Circuitry 820 may generate increase/decrease signals to a current limit circuit 821 comprising an adjustable reference 822, current detector 823, and comparison circuit 824. Current detector 823 may sense either input or output current of the switching regulator, for example. When inactive, the sensed current may be below the reference 822. If the sensed current increases above the reference 822, an output of comparison circuit changes state and controls the PWM signal and FETs to prevent any additional increases in the sensed current, thereby setting a maximum for the sensed current. In different implementations, the outputs of adjustable reference 822 and current detector 823 may be voltages or currents, for example.

In some implementations, a hardware or software algorithm may control the adjustment of reference 822. In one embodiment, an algorithm 890 may be implemented by a digital control unit 830, which receives incr/decr signal from circuitry 820 and adjusts reference 822, for example. In other embodiments, algorithm 890 may be implemented by a processor or PMIC, as illustrated at 802, and control signals may be communicated between the processor/PMIC and the battery charger 810 via controller 805.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. An apparatus comprising:
   a case having an inside, an internal surface surrounding the inside, and an external surface opposite to the internal surface;
   a battery charger circuit in the inside of the case, wherein the battery charger is configured to charge a battery, the battery charger circuit comprising a current limit circuit configured to set a maximum current in the battery charger circuit;
   a thermal sensor circuit in the inside of the case and in direct contact with the internal surface of the case, wherein the thermal sensor circuit is not in contact with the battery and the battery charging circuit,
   wherein the thermal sensor circuit is configured to sense a temperature on the internal surface of the case and to adjust the current limit circuit in the battery charger circuit when the temperature on the internal surface of the case meets a threshold.

2. The apparatus of claim 1 wherein the thermal sensor circuit comprises a thermistor, the apparatus further comprising a resistor configured between a reference voltage and a terminal of the thermistor.

3. The apparatus of claim 1 wherein a first voltage on a terminal of the temperature sensor circuit changes based on the temperature on the internal surface, and wherein the first voltage is coupled to a terminal of the battery charger circuit to adjust the current limit circuit.

4. The apparatus of claim 3 wherein the battery charger circuit further comprises:
   a comparator having a first terminal to receive the first voltage and a second terminal coupled to a reference voltage, wherein the comparator reduces the maximum current in the battery charging circuit when the first voltage meets the reference voltage.

5. The apparatus of claim 4 wherein the reference voltage is programmable.

6. The apparatus of claim 4 wherein the comparator comprises hysteresis.

7. The apparatus of claim 4 wherein the reference voltage is generated by a resistor divider.

8. The apparatus of claim 3 wherein the battery charger circuit further comprises:
   an analog-to-digital converter having a first terminal to receive the first voltage and a second terminal coupled to a reference voltage, the analog-to-digital converter generating a digital representation of the first voltage; and
   a digital comparator to receive the digital representation of the first voltage and a digital representation of the threshold,
   wherein the analog-to-digital converter reduces the maximum current in the battery charger circuit when the digital representation of the first voltage meets the digital representation of the threshold.

9. The apparatus of claim 8 wherein the digital representation of the threshold is programmable.

10. The apparatus of claim 1 wherein the thermal sensor circuit is located proximate to one of the battery charger circuit, a processor, an RF circuit, and a display circuit.

11. The apparatus of claim 1 wherein the thermal sensor circuit is a plurality of thermal sensor circuits, and wherein the apparatus is a mobile device, the mobile device further comprising:
    a battery configured inside said case of said mobile device;
    a processor receiving power through the battery charger circuit;
    an RF circuit receiving power through the battery charger circuit; and
    a multiplexer having a plurality of inputs coupled to the plurality of thermal sensor circuits to select one of the thermal sensor circuits having a highest temperature to adjust the current limit circuit,
    wherein the plurality of thermal sensor circuits are configured proximate to a location of at least the battery charger circuit, the processor, and the RF circuit to control a temperature of hot spots generated at the internal surface of the case by the battery charger circuit, the processor, and the RF circuit.

12. The apparatus of claim 11 wherein a first thermal sensor circuit is configured between the battery charger circuit and a first internal surface location, a second thermal sensor circuit is configured between the processor and a second internal surface location, and a third thermal sensor circuit is configured between the RF circuit and a third internal surface location.

13. The apparatus of claim 1 wherein battery charger comprises a switching regulator, and wherein the current limit circuit comprises:
    an adjustable reference having an input coupled to the thermal sensor circuit and an output coupled to a comparison circuit; and
    a current detector having an input to detect a current in the switching regulator and an output coupled to the comparison circuit,
    wherein when a voltage at the output of the current detector meets a voltage at the output of the adjustable reference, the comparison circuit sets a maximum duty cycle of the switching regulator.

14. The apparatus of claim 1 wherein a first thermal sensor circuit is configured between the internal surface of the case and at least one of the battery charger circuit, a processor, an RF circuit, a power management integrated circuit, and a display circuit to control the case temperature.

15. A method comprising:
sensing a temperature on an internal surface of a case of a mobile device using a thermal sensor circuit, wherein the case having an inside, the internal surface surrounding the inside, and an external surface opposite to the internal surface, and wherein the thermal sensor circuit is in the inside of the case and is in direct contact with the internal surface of the case;
adjusting a current limit circuit in a battery charger circuit when the temperature on the internal surface of the case meets a threshold, wherein the battery charger circuit is in the inside of the case and is configured to charge a battery, wherein the battery charger circuit comprises the current limit circuit that is configured to set a maximum current in the battery charger circuit, and wherein the thermal sensor circuit is not in contact with the battery and the battery charger circuit.

16. The method of claim 15 wherein a first voltage on a terminal of the temperature sensor circuit changes based on the temperature on the case, and wherein the first voltage is coupled to a terminal of the battery charger circuit to adjust the current limit circuit.

17. The method of claim 16 further comprising comparing, by the battery charger circuit, the first voltage and a reference voltage, and in accordance therewith, reducing the maximum current in the battery charging circuit when the first voltage meets the reference voltage.

18. The method of claim 16 further comprising:
converting, by the battery charger, the first voltage to a digital representation of the first voltage;
digitally comparing the digital representation of the first voltage and a digital representation of the threshold; and
reducing the maximum current in the battery charger circuit when the digital representation of the first voltage meets the digital representation of the threshold.

19. The method of claim 18 wherein the digital representation of the threshold is programmable.

20. The method of claim 15 wherein the thermal sensor circuit is located proximate to one of the battery charger circuit, a processor, an RF circuit, and a display circuit.

21. The method of claim 15 wherein the thermal sensor circuit is a plurality of thermal sensor circuits, the method further comprising:
iteratively selecting one of a plurality of thermal sensor circuits to determine one of the thermal sensor circuits having a highest temperature to adjust the current limit circuit,
wherein the plurality of thermal sensor circuits are configured proximate to at least the battery charger, a processor, and an RF circuit.

22. The method of claim 15 wherein battery charger circuit comprises a switching regulator, the method further comprising comparing a reference set based on the sensed temperature to a detected current in the current regulator, and in accordance therewith, setting a maximum duty cycle of the switching regulator when the detected current increases above the reference.

* * * * *